United States Patent
Lord et al.

(10) Patent No.: US 8,313,285 B2
(45) Date of Patent: Nov. 20, 2012

(54) VARIABLE AREA NOZZLE ASSISTED NOISE CONTROL OF A GAS TURBINE ENGINE

(75) Inventors: Wesley K. Lord, South Glastonbury, CT (US); Zbigniew M. Grabowski, Farmington, CT (US)

(73) Assignee: United Technologies Corporation, Hartford, CT (US)

( * ) Notice: Subject to any disclaimer, the term of this patent is extended or adjusted under 35 U.S.C. 154(b) by 946 days.

(21) Appl. No.: 12/374,380

(22) PCT Filed: Oct. 12, 2006

(86) PCT No.: PCT/US2006/039944
§ 371 (c)(1),
(2), (4) Date: Jan. 20, 2009

(87) PCT Pub. No.: WO2008/045064
PCT Pub. Date: Apr. 17, 2008

(65) Prior Publication Data
US 2009/0297338 A1    Dec. 3, 2009

(51) Int. Cl.
*F03D 11/00* (2006.01)
*F01D 5/00* (2006.01)
*F01D 25/04* (2006.01)
*F03B 11/04* (2006.01)
*F04D 29/66* (2006.01)
(52) U.S. Cl. ...................... 415/119; 415/126
(58) Field of Classification Search .......... 415/119, 415/126, 211, 2, 118, 211.2
See application file for complete search history.

(56) References Cited

U.S. PATENT DOCUMENTS

| 3,622,075 | A | 11/1971 | Harris et al. |
| 6,554,564 | B1 * | 4/2003 | Lord .............................. 415/119 |
| 2004/0031258 | A1 | 2/2004 | Papamoschou |
| 2005/0039437 | A1 | 2/2005 | Lair |
| 2005/0166575 | A1 | 8/2005 | Birch et al. |
| 2006/0101807 | A1 | 5/2006 | Wood et al. |

FOREIGN PATENT DOCUMENTS

EP    1843030 A2    10/2007

OTHER PUBLICATIONS

Search Report and Written Opinion mailed on Nov. 14, 2007 for PCT/US2006/039944.

* cited by examiner

*Primary Examiner* — Chuong A Luu
*Assistant Examiner* — Nga Doan
(74) *Attorney, Agent, or Firm* — Carlson, Gaskey & Olds PC

(57) ABSTRACT

An example turbofan engine sound control system includes a core nacelle (12) housing a compressor and a turbine. The core nacelle is disposed within a fan nacelle (34). The fan nacelle includes a turbofan. A bypass flow path downstream from the turbofan is arranged between the two nacelles. A controller (50) is programmed to manipulate the nozzle exit area to control sound propagating from the engine. In one example, the controller manipulates the nozzle exit area using hinged flaps (42) to control engine sound. The hinged flaps open and close to adjust the nozzle exit area and the associated bypass flow rate.

22 Claims, 3 Drawing Sheets

VARIABLE AREA NOZZLE ASSISTED NOISE CONTROL OF A GAS TURBINE ENGINE

BACKGROUND OF THE INVENTION

This invention relates to controlling noise propagating from a gas turbine engine, and, more particularly, to controlling noise by effectively altering the nozzle exit area.

Gas turbine engines are widely known and used for power generation and vehicle (e.g., aircraft) propulsion. The engine produces engine noise due to the airflow moving through the engine and the various moving components within the engine. A person within the aircraft cabin may hear the engine noise. A person living near to an airport may often hear engine noise from the aircraft taking off and landing at the airport. Community noise is ordinarily defined as the aircraft noise perceivable by people located on the ground in the vicinity of the airport. Engine noise may limit an aircraft's ability to land at certain airports after certain hours, causing loss of revenue for an airline.

Noise from the engine primarily propagates fore and aft of the engine. The frequency content of the noise includes a tonal component and a broadband component. The fan section of the engine is a major contributor to overall engine noise, especially the tonal component. The size of the fan section relates, in part, to the desired bypass ratio for the engine, which is the ratio of fan bypass flow to core engine flow. The trend in commercial aircraft has been to increase the bypass ratio of the engine. However, increasing the bypass ratio generally requires increasing the size of the fan section within the turbofan engine, which may increase the noise contribution of the fan section.

What is needed is a method of optimizing engine noise for various flight conditions while maintaining engine thrust.

SUMMARY OF THE INVENTION

An example turbofan engine includes a core nacelle housing a compressor, combustor, and a turbine. A bypass flow path downstream from the fan section of the engine is a separate annular region radially outboard of and surrounding the core. A controller is programmed to manipulate the exit area of the fan nozzle to control noise propagating from the engine. In one example, the controller manipulates the fan nozzle exit area using hinged flaps to control engine noise. The hinged flaps open and close to adjust the nozzle exit area and the associated bypass flow rate.

Noise from the engine includes a tonal component and a broadband component. When combined with other engine parameters, such as fan speed, modifying the effective nozzle exit area enables an operator to achieve similar thrust through the bypass flow path with different overall noise levels. Further, changing the effective nozzle exit area also alters the combination of tonal and broadband components and the noise directivity. Depending on a flight condition, such as approach, cruise, or take-off, the overall level of engine noise can be optimized, as well as the combinations of the tonal and the broadband components. Directivity of the engine noise can also be controlled.

These and other features of the present invention can be best understood from the following specification and drawings, the following of which is a brief description.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
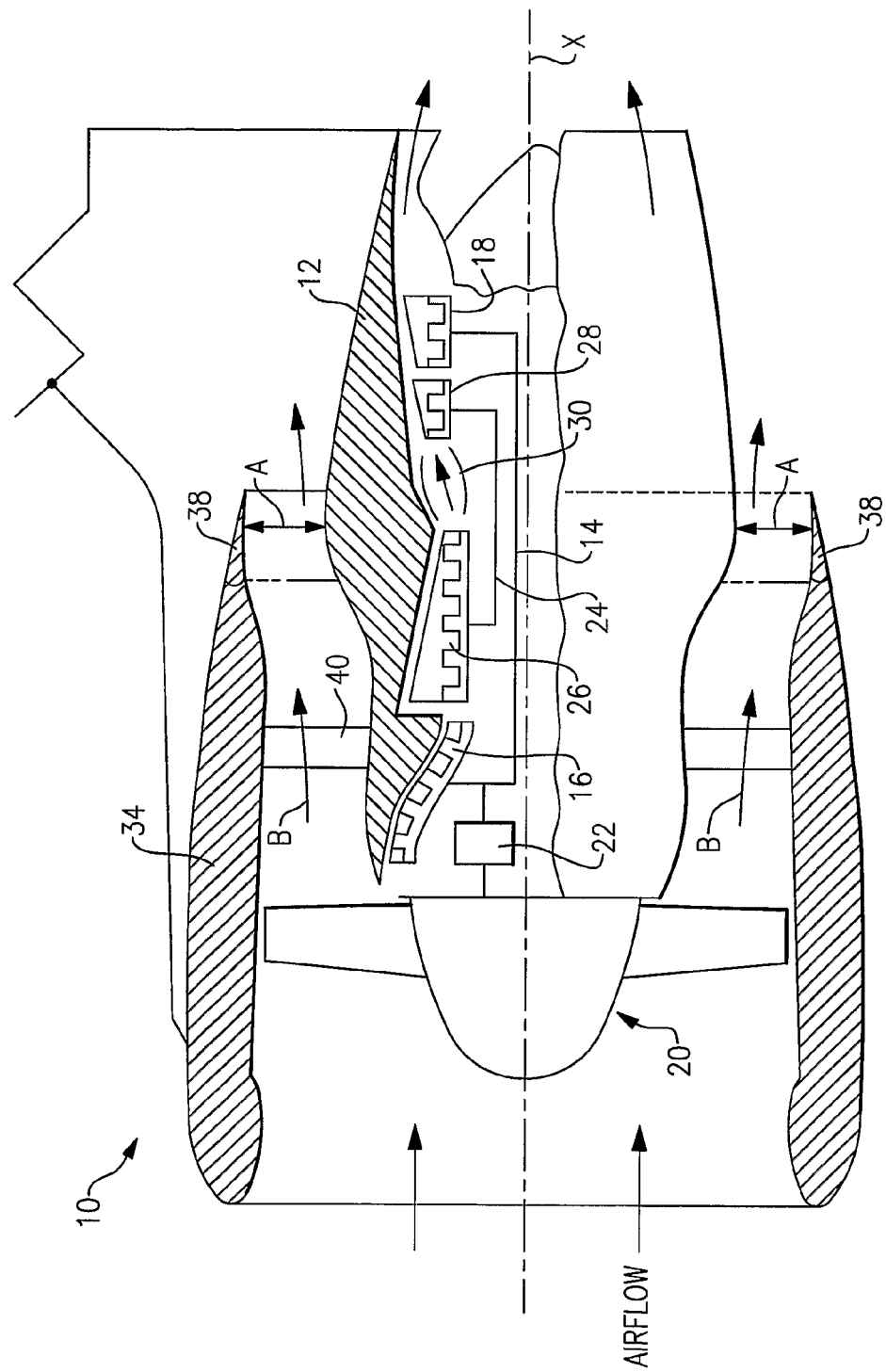
FIG. 1 illustrates selected portions of an example gas turbine engine system.

A geared turbofan engine 10 is shown in FIG. 1. The engine 10 includes a core nacelle 12 that houses a low rotor 14 and high rotor 24. The low rotor 14 supports a low pressure compressor 16 and low pressure turbine 18. In this example, the low rotor 14 drives a fan section 20 through a gear train 22. The fan section 20 rotates about an axis X and includes a plurality of fan blades 36. The high rotor 24 rotationally supports a high pressure compressor 26 and a high pressure turbine 28. A combustor 30 is arranged between the high pressure compressor 26 and high pressure turbine 28. The low and high rotors 14, 24 rotate about the axis X, and at least a portion of the core nacelle 12 is disposed within a fan nacelle 34. As is known, the engine 10 produces noise when running.

In the examples shown, the engine 10 is a high bypass turbofan arrangement. In one example, the bypass ratio is greater than 10:1, and the fan diameter is substantially larger than the diameter of the low pressure compressor 16. The low pressure turbine 18 has a pressure ratio that is greater than 5:1, in one example. The gear train 22 can be any known suitable gear system, such as a planetary gear system with orbiting planet gears, planetary system with non-orbiting planet gears, or other type of gear system. It should be understood, however, that the above parameters are only exemplary of a contemplated geared turbofan engine. That is, the invention is applicable to other types of engines, including those with direct drive fans.

For the engine 10 shown FIG. 1, a significant amount of thrust may be provided by a bypass flow B between the core nacelle 12 and a fan nacelle 34 due to the high bypass ratio. Thrust is a function of density, velocity, and area. One or more of these parameters can be manipulated to vary the amount and direction of thrust provided by the bypass flow B. In one example, the engine 10 includes a nozzle structure 38 associated with the nozzle exit area A to change the physical area and geometry to manipulate the thrust provided by the bypass flow B. However, it should be understood that the nozzle exit area A may be effectively altered by other than structural changes, for example, by altering a boundary layer of the bypass flow B. Furthermore, it should be understood that effectively altering the nozzle exit area A is not limited to physical locations approximate to the exit of the fan nacelle 34, but rather, includes altering the bypass flow B by any suitable means at any suitable location.

Figure 2:
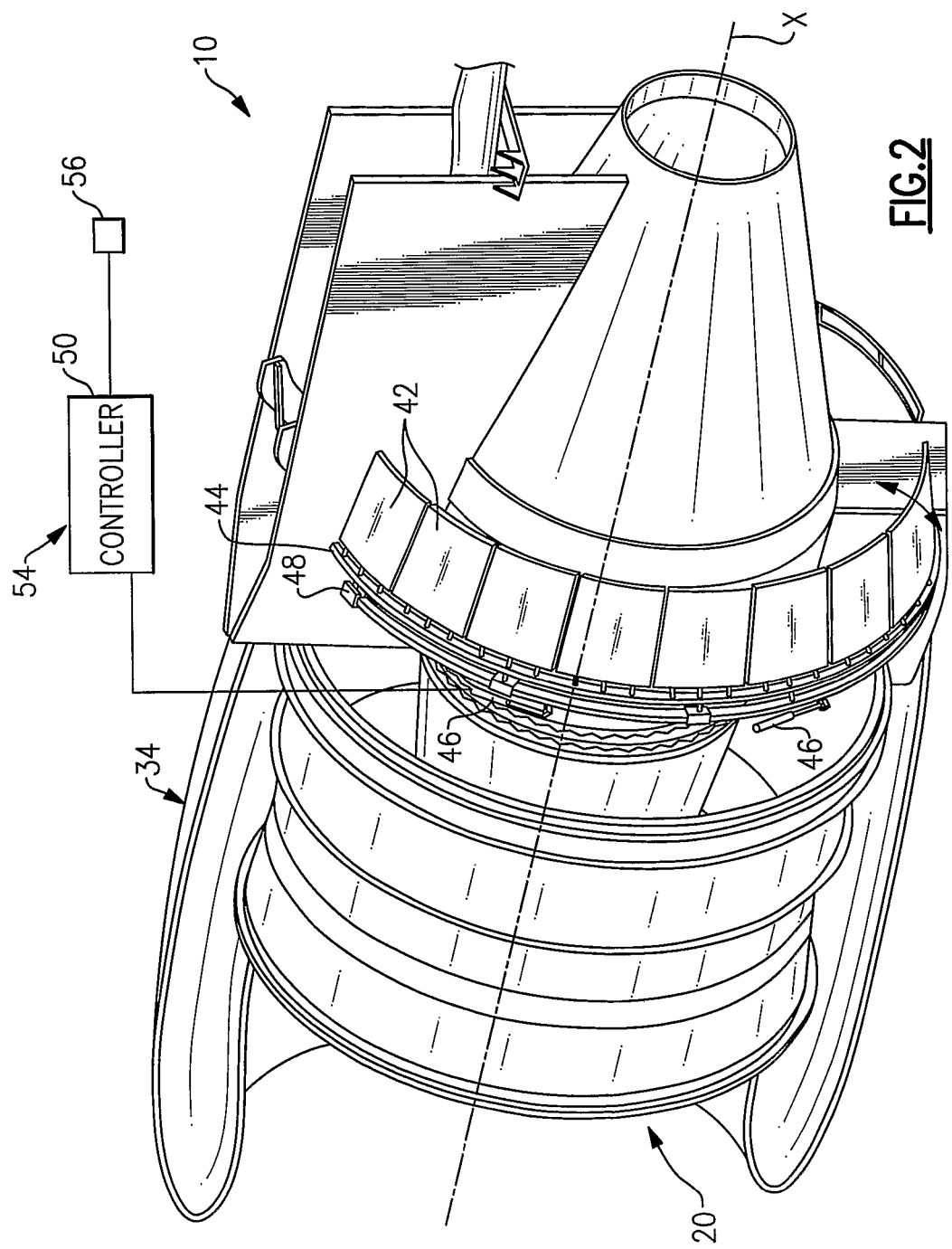
FIG. 2 illustrates a variable area nozzle within the gas turbine engine system shown in FIG. 1.

In the example shown in FIG. 2, an engine noise control system 54 includes multiple hinged flaps 42 arranged circumferentially about the rear of the fan nacelle 34. The hinged flaps 42 form a portion of engine noise control system 54, which further includes a controller 50 in communication with actuators 46 used to manipulate the hinged flaps 42. The controller 50 also communicates with a driver 56, which may be controlled by an aircraft operator or may operate automatically. In one example, the driver 56 monitors and communicates aircraft altitude and airspeed to the controller 50. Based on the combination of altitude and airspeed, the controller 50 commands the actuators 46 to actuate the hinged flaps 42 and reduce engine noise for the particular combination of altitude and airspeed. The controller 50 thereby uses the altitude and airspeed of the aircraft to reduce the noise level, such as to reduce the noise level perceived in a community or within an aircraft cabin. Further, different combinations of the position of the hinged flaps 42 and the rotational speed of the fan section 20 produce similar amounts of thrust. The controller 50 may command the actuators 46 to actuate the hinged flaps 42 based on the thrust and/or rotational speed measurement of a component of the engine 10. In so doing, the controller 50 controls engine noise while maintaining a desired thrust.

The hinged flaps 42 can be actuated independently and/or in groups using segments 44. The segments 44 and individual hinged flaps 42 can be moved angularly using actuators 46. The engine noise control system 54 thereby varies the nozzle exit area A (FIG. 1) between the hinged flaps 42 and the engine 10 by altering positions of the hinged flaps 42. In a closed position, the hinged flap 42 is closer to the core nacelle 12 for a relatively smaller nozzle exit area A. In an open position, the hinged flap 42 is farther away from the core nacelle 12 for a relatively larger nozzle exit area A.

Figure 3:
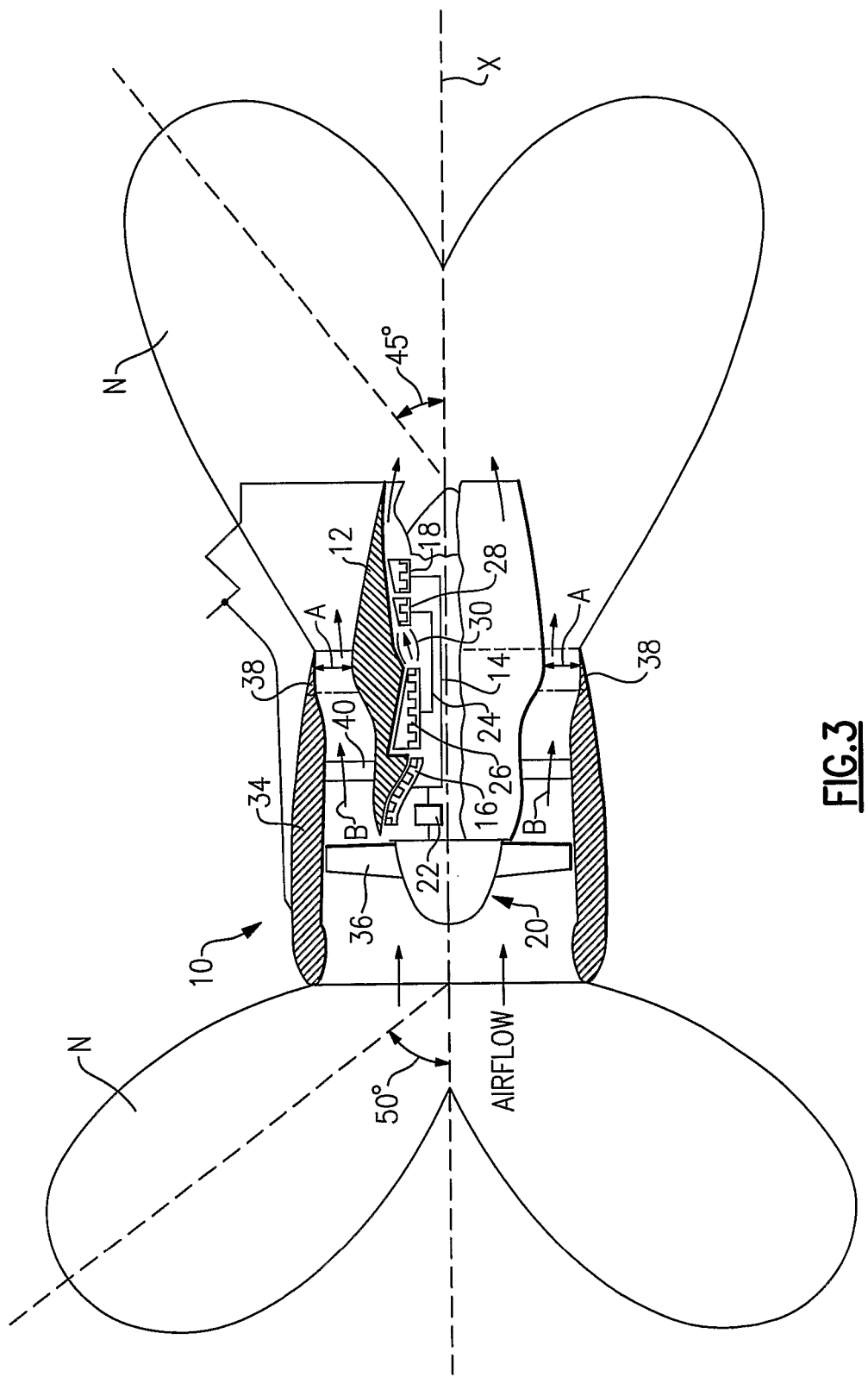
FIG. 3 illustrates example lobes of fan noise extending from the gas turbine engine system shown in FIG. 1.

When operating, the fan section 20 of the engine 10 produces sound waves that propagate as lobes of fan noise N fore and aft, as shown in FIG. 3. The lobes of fan noise N include both a broadband component and a tonal component. The broadband component is acoustic energy that is distributed across a range of frequencies, whereas the tonal component is acoustic energy focused within a narrow range of frequencies. The fan section 20 is the major contributor to the overall tonal component of noise propagating from the engine, although other portions of the engine 10, such as the compressor 16 and turbine 18, may contribute at certain conditions. In this example, the rotating portions of the fan section 20 generate the tonal component at approximately 1000 Hz. Although only fan noise N is shown in this example, many portions of the engine 10 (e.g., the combustor 30, the rotors 14 and 24) contribute to the overall engine noise. Each portion has an associated intensity and directivity, and each portion is similarly modifiable with the invention. Although the example engine 10 includes hinged flaps 42 on the fan nacelle 34, other portions of the engine 10 may include hinged flaps 42, such as the core nacelle 12 (FIG. 1). Positioning hinged flaps 42 on the core nacelle 12 may control noise from the compressors 16, 26; the combustor 30 and/or the turbines 18, 28.

Although the engine 10 in the example embodiment produces engine noise, those skilled in the art and having the benefit of this disclosure will understand that engine noise is not limited to uncomfortable levels of sound produced by the engine 10. That is, the disclosed example may be used to control various levels of sound from the engine 10.

Fan noise N extends from the engine 10 in all directions, but the highest concentrations extend in the area of these lobes. When seated in an aircraft cabin, the directivity angle of an aircraft passenger relative to the engine 10 is fixed. If the seated position of the passenger is not within the fan noise N lobes, the passenger may not perceive uncomfortable levels of fan noise N from the engine 10. As an example, a passenger seated toward the front of an aircraft cabin may be positioned within the fan noise N lobe extending forward from the engine and, more specifically, seated at an angle of about 50 degrees relative to the axis X. Such a passenger would experience a relatively large amount of fan noise N within the cabin. Altering the effective nozzle area A alters the intensity and the position of the lobes of fan noise N. As such, the effective nozzle area A may be adjusted to direct the peak of fan noise N away from the passenger seated toward the front of the cabin, as well as lessen the intensity.

Regarding the lobes of fan noise N extending rearward from the engine 10, airflow communicating through the engine 10 experiences a wake deficit, or non-uniform flow, after moving over the plurality of fan blades 36. Each fan blade 36 creates a wake deficit, or pocket of lower velocity airflow. Stators 40, placed in the bypass flow path B, streamline the airflow and remove the swirl from the airflow through the bypass flow path B. Airflow over the stators 40 may have a vortex flow pattern, but the stators 40 straighten the airflow such that the airflow has a substantially axial flow pattern when communicating through the nozzle exit area A.

The wake deficits from the rotating fan blades 36 cause a time-dependent variation of pressure on the stators 40, which in turn generates the tonal component of the fan noise N propagating aft of the engine 10. Modifying the effective nozzle exit area A affects the structure of the wake deficits from the fan blades 36 and the associated fan noise N. As a result, an operator can modify the effective nozzle exit area A to change the associated fan noise N.

Modifying the effective nozzle exit area A increases the potential operating points for an engine 10 that are capable of achieving similar levels of thrust through the bypass flow path B. As a result, the operating point of the engine 10 can be tuned to facilitate overall noise reduction. As an example, a typical cruising altitude for an aircraft is about 35,000 feet. Different combinations of effective nozzle exit area A and fan section 20 speed and other engine 10 parameters may produce the same desired airspeed at this altitude. As a result, the operator is free to choose the combination of nozzle exit area A and fan section 20 speed to control overall perceived engine noise while maintaining required thrust. Because of the altitude, community noise is not an issue, thus the specific conditions may be further refined to control cabin noise.

In another example, during the climbing flight stage, many sizes of the effective nozzle exit area A produce desired thrust. Thus, the effective nozzle exit area A can be sized to minimize noise from the engine 10. During climb, community noise remains a factor especially at lower altitudes, thus the effective nozzle exit area may be sized to minimize the tonal component propagating from the engine 10, as the tonal component is an undesirable contributor to community noise. Thus, modifying the effective nozzle exit area A affects perceived noise from the engine 10 and provides a degree of freedom for designers or operators to control noise N, and the noise level may be reduced for the particular flight stage, e.g., take-off, climb, cruise, descent.

Although a preferred embodiment of this invention has been disclosed, a worker of ordinary skill in this art may recognize certain modifications falling within the scope of this invention. For that reason, the following claims should be studied to determine the true scope of coverage for this invention.

What is claimed is:

1. A turbofan engine sound control system, comprising:
   a core nacelle housing a compressor and a turbine;
   a fan nacelle housing a fan section that is arranged upstream from said core nacelle;
   a bypass flow path downstream from said fan section and arranged between said core nacelle and said fan nacelle, said bypass flow path including an effective nozzle exit area;
   hinged nozzle flaps defining said effective nozzle exit area and extending substantially continuously about an axis of the bypass flow path; and a controller programmed to actuate said at least one hinged nozzle flap between multiple positions and to adjust a rotational speed of the fan section to control sound from said engine while maintaining a thrust.

2. The turbofan engine sound control system of claim 1, wherein said sound includes a tonal noise component.

3. The turbofan engine sound control system of claim 1, wherein said sound includes a broadband noise component.

4. The turbofan engine sound control system of claim 1, including a control device arranged to receive a command from said controller in response to a flight condition, said control device changing said effective nozzle exit area provided between said core nacelle and fan nacelle in response to said command.

5. The turbofan engine sound control system of claim 4, wherein said control device changes a physical area of said effective nozzle exit area in response to said command.

6. The turbofan engine sound control system of claim 4, wherein a driver communicates said flight condition to said controller.

7. The turbofan engine sound control system of claim 4, wherein said flight condition is a cruising flight stage of said aircraft.

8. The turbofan engine sound control system of claim 1, wherein the thrust is a constant thrust.

9. The turbofan engine sound control system of claim 1, wherein said controller is programmed to alter a directionality of the sound such that a peak of the sound is directed toward a desired area of an aircraft.

10. The turbofan engine sound control system of claim 1, wherein said controller is programmed to actuate said hinged nozzle flaps between multiple positions and to adjust a rotational speed of the fan section to further control an intensity of sound from said engine while maintaining the thrust.

11. A method of controlling turbofan engine sound, comprising:
   a) generating a thrust at a thrust level from a turbofan engine; and
   b) actuating hinged nozzle flaps, adjusting a rotational speed of said turbofan engine, or both to alter a directivity angle of engine sound while maintaining said thrust at the thrust level, said hinged nozzle flaps at least partially defining an effective nozzle exit area of the turbofan engine.

12. A method of controlling turbofan engine sound according to claim 11, including
   c) determining a level of the engine sound while maintaining the thrust.

13. The method of controlling turbofan engine sound according to claim 11, wherein the engine sound level reduces at least one of a tonal noise component and a broadband noise component.

14. The method of controlling turbofan engine sound according to claim 11, including:
   d) monitoring a position of the turbofan engine with a controller to determine a engine sound level.

15. The method of controlling turbofan engine sound according to claim 11, wherein the engine sound includes a sound peak that propagates from the engine over a lobe-shape area defined by an angle to an engine axis of rotation, and said step (b) includes changing the effective nozzle exit area to redirect the angle of the sound peak.

16. The method of controlling turbofan engine sound according to claim 15, wherein said step (b) includes changing the effective nozzle exit area to redirect the lobes.

17. The method claim 11, wherein the thrust is a consistent thrust.

18. The method of claim 11, wherein the directionality of the sound is altered to direct a peak of the sound toward an area of an aircraft.

19. The method of claim 11, wherein an amount of thrust in said step (a) is the same as an amount of thrust in said step (b).

20. The method of claim 11, wherein the control is further controlling an intensity of engine sound.

21. A method of controlling turbofan engine sound, comprising:
   a) generating a thrust from a turbofan engine at a first level;
   b) actuating hinged nozzle flaps, adjusting a rotational speed of the turbofan engine, or both, to direct a peak of engine sound toward a desired area of an aircraft; and
   c) maintaining the thrust at the first level during the actuating.

22. The method of claim 21, wherein the hinged nozzle flaps at least partially define an effective nozzle exit area of the turbofan engine.

* * * * *